United States Patent [19]
Mishina

[11] Patent Number: 6,085,088
[45] Date of Patent: Jul. 4, 2000

[54] INTEROFFICE HAND-OFF PROCESSING SYSTEM AND INTEROFFICE HAND-OFF METHOD

[75] Inventor: Naruhito Mishina, Nagoya, Japan

[73] Assignee: Fujitsu Limited, Kanagawa, Japan

[21] Appl. No.: 09/122,413

[22] Filed: Jul. 24, 1998

[30] Foreign Application Priority Data

Mar. 19, 1998 [JP] Japan ............................ 10-069943

[51] Int. Cl.⁷ .............................. H04Q 7/22; H04B 7/26
[52] U.S. Cl. ...................... 455/436; 455/450; 455/453; 455/511
[58] Field of Search ................................ 455/436, 437, 455/438, 439, 440, 441, 442, 450, 452, 453, 511; 370/331, 335

[56] References Cited

U.S. PATENT DOCUMENTS

| | | | |
|---|---|---|---|
| 4,670,899 | 6/1987 | Brody et al. ............................ | 455/436 |
| 5,239,678 | 8/1993 | Grube et al. ............................ | 455/511 |
| 5,442,809 | 8/1995 | Diaz et al. .............................. | 455/511 |
| 5,574,977 | 11/1996 | Joseph et al. .......................... | 455/450 |
| 5,850,606 | 12/1998 | Bedingfield, Sr. et al. ............ | 455/439 |
| 5,940,763 | 8/1999 | Alperovich et al. ................... | 455/450 |

*Primary Examiner*—Reinhard J. Eisenzopf
*Assistant Examiner*—Duc Nguyen
*Attorney, Agent, or Firm*—Helfgott & Karas, P.C.

[57] ABSTRACT

An interoffice hand-off processing system and an interoffice hand-off method which ensure the maintenance of a call of a mobile unit making interoffice movement even while an interoffice Map link is congested. When requested to execute an interoffice hand-off, unused channel selecting means of the interoffice hand-off processing system refers to an interoffice control signal link management table to search for an unused channel. If the interoffice control signal link is congested and no unused channel is found, reference is made to an interoffice speech link management table to select an unused channel. Using the channel thus selected, interoffice hand-off executing means executes the interoffice hand-off.

6 Claims, 14 Drawing Sheets

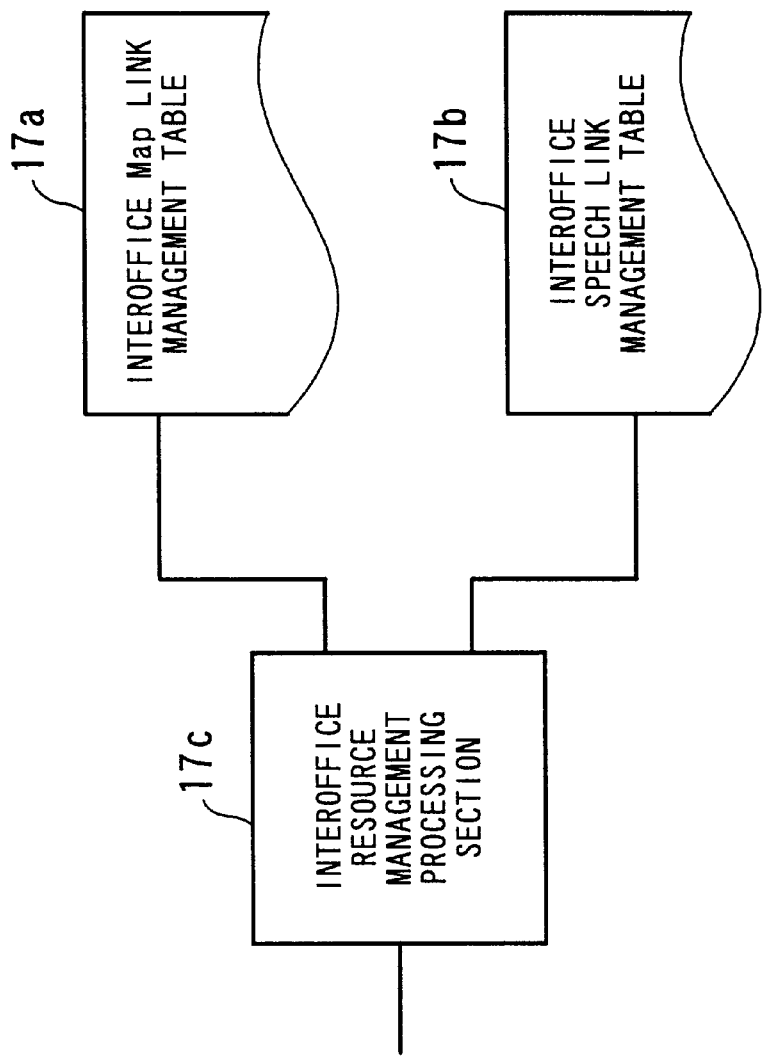
F I G. 4

INTEROFFICE HAND-OFF PROCESSING SYSTEM AND INTEROFFICE HAND-OFF METHOD

BACKGROUND OF THE INVENTION

(1) Field of the Invention

The present invention relates to an interoffice hand-off processing system and an interoffice hand-off method, and more particularly, to an interoffice hand-off processing system provided in a mobile communication exchange having an interoffice control signal link and an interoffice speech link for communications with other mobile communication exchanges and to an interoffice hand-off method executed in the processing system.

(2) Description of the Related Art

Generally, in a mobile communication system, when a mobile unit moves from a service zone covered by a base station connected to a first mobile communication exchange to another service zone covered by another base station connected to a second mobile communication exchange during a call, it is necessary that an interoffice hand-off process for maintaining the call of the mobile unit should be performed between the first and second mobile communication exchanges. In a mobile communication system using CDMA (Code Division Multiple Access) technique in particular, soft hand-off is carried out as such hand-off. The hand-off is also called hand-over.

Conventionally, when the interoffice hand-off process is required due to movement of a mobile unit, the mobile communication exchange away from which the mobile unit is moving acquires an idle channel in an interoffice control signal link and, using the acquired idle channel, transmits an interoffice hand-off signal to the mobile communication exchange toward which the mobile unit is moving. Based on the interoffice hand-off signal, an interoffice speech path using an interoffice speech link is established between the receding-side mobile communication exchange and the approaching-side mobile communication exchange. This permits the mobile unit to maintain the call via the approaching-side mobile communication exchange, the interoffice speech path, and the receding-side mobile communication exchange in order.

The interoffice control signal link is a link which connects between mobile communication exchanges, like the interoffice speech link, for transmitting interoffice control signals therethrough. In CDMA mobile communication systems, the interoffice control signal link is defined as interoffice Map link (IMSCCID) in accordance with the ITU-T (International Telecommunication Union-Telecommunication Sector) recommendations. The interoffice speech link includes ISUP link and TUP link. The ISUP link and the TUP link differ from each other in the form of signal used.

If the number of mobile units making interoffice movement becomes large, the traffic of the interoffice control signal link increases, possibly causing congestion. In the CDMA mobile communication exchange, however, the interoffice Map link and the interoffice speech link are managed separately from each other. It is, therefore, not possible to use the interoffice speech link even when the interoffice Map link is congested. As a result, even if the interoffice hand-off process is required, an idle channel of the interoffice Map link cannot be acquired and thus the interoffice hand-off signal cannot be transmitted, bringing about a situation where the call of a mobile unit making interoffice movement is forcibly disconnected.

SUMMARY OF THE INVENTION

An object of the present invention is to provide an interoffice hand-off processing system and an interoffice hand-off method which ensure the maintenance of a call of a mobile unit making interoffice movement even while an interoffice Map link is congested.

To achieve the above object, there is provided an interoffice hand-off processing system for a mobile communication exchange having an interoffice control signal link and an interoffice speech link for communications with another mobile communication exchange. The interoffice hand-off processing system comprises an interoffice control signal link management table having status of use of the interoffice control signal link described therein, an interoffice speech link management table having status of use of the interoffice speech link described therein, unused channel selecting means for searching for an unused channel by referring to the interoffice control signal link management table when execution of an interoffice hand-off is requested from a subordinate base station, the unused channel selecting means selecting an unused channel by referring to the interoffice speech link management table if no unused channel is found, and interoffice hand-off executing means for executing the interoffice hand-off by using the channel selected by the unused channel selecting means.

To achieve the above object, there is also provided an interoffice hand-off method for an interoffice hand-off processing system provided in a mobile communication exchange having an interoffice control signal link and an interoffice speech link for communications with another mobile communication exchange. The interoffice hand-off method comprises the first step of monitoring status of use of the interoffice control signal link and storing the status of use in an interoffice control signal link management table, the second step of monitoring status of use of the interoffice speech link and storing the status of use in an interoffice speech link management table, the third step of searching for an unused channel by referring to the interoffice control signal link management table when execution of an interoffice hand-off is requested from a subordinate base station, the fourth step of selecting an unused channel by referring to the interoffice speech link management table if no unused channel is found as a result of search in the third step, and the fifth step of executing the interoffice hand-off by using the channel selected in the fourth step.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram showing the internal arrangement of an IHT resource management section;

DESCRIPTION OF THE PREFERRED EMBODIMENTS

Embodiments of the present invention will be hereinafter described with reference to the drawings.

Figure 1:
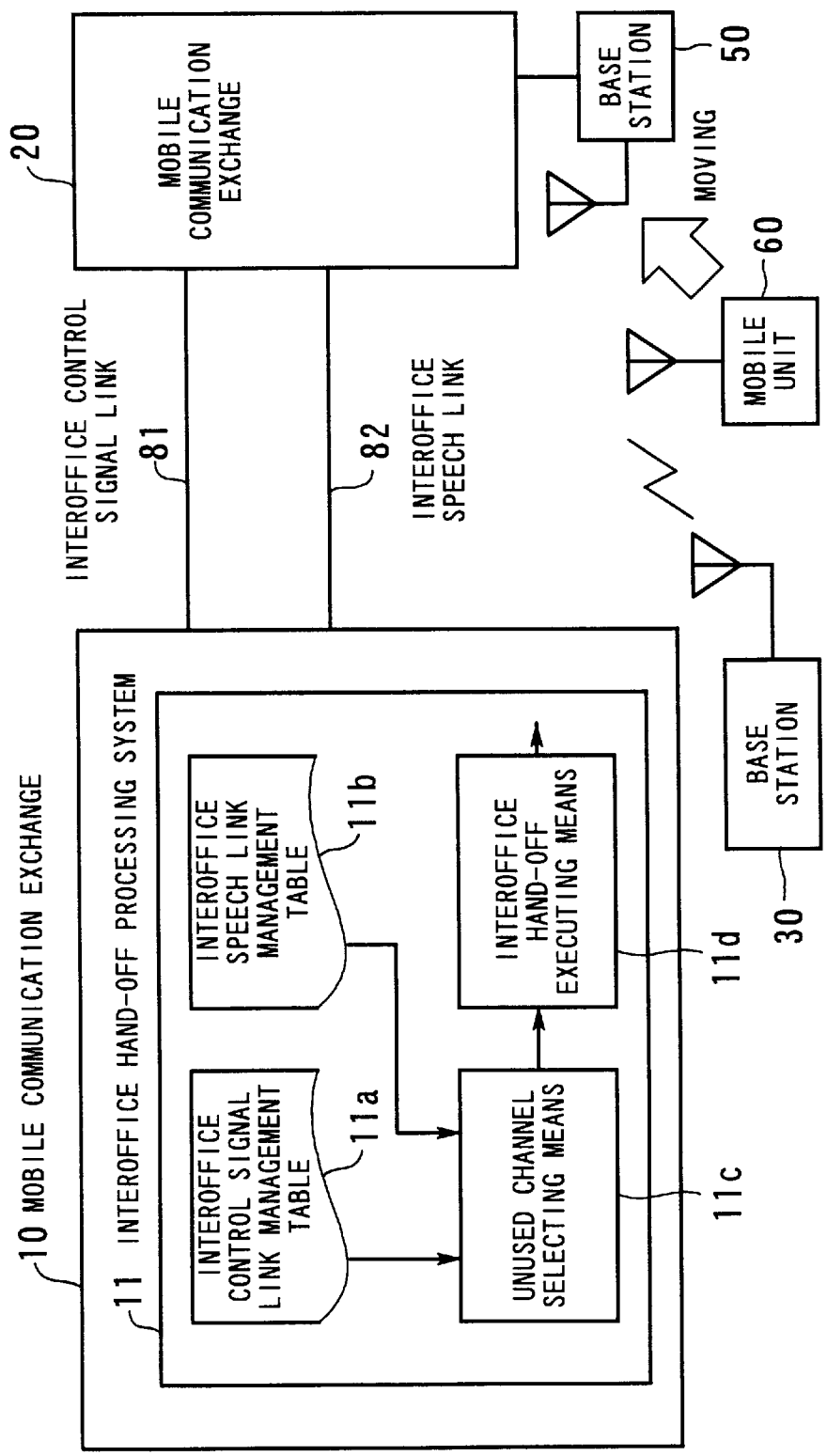
FIG. 1 is a diagram illustrating the principles of the present invention.

Referring first to FIG. 1, a theoretical configuration according to a first embodiment will be explained. An interoffice hand-off processing system 11 according to the first embodiment comprises an interoffice control signal link management table lha having status of use of an interoffice control signal link 81 described therein, an interoffice speech link management table 11b having status of use of an interoffice speech link 82 described therein, unused channel selecting means 11c for searching for an unused channel by referring to the interoffice control signal link management table lha when execution of an interoffice hand-off is requested from a subordinate base station 30, the unused channel selecting means 11c selecting an unused channel by referring to the interoffice speech link management table 11b if no unused channel is found, and interoffice hand-off executing means 11d for executing the interoffice hand-off by using the channel selected by the unused channel selecting means 11c.

In the configuration described above, let it be assumed that a mobile unit 60 within a service zone covered by the base station 30 requests execution of an interoffice hand-off to the interoffice hand-off processing system 11 via the base station 30 while moving to a service zone covered by another base station 50.

In this case, the unused channel selecting means 11c of the interoffice hand-off processing system 11 refers to the interoffice control signal link management table 11a to search for an unused channel. If an unused channel is found, an interoffice hand-off signal is transmitted to a mobile communication exchange 20 by using the channel, as in conventional procedure.

On the other hand, if the interoffice control signal link is congested and no unused channel is found, the unused channel selecting means 11c refers to the interoffice speech link management table 11b to select an unused channel. Using the channel selected in this manner, the interoffice hand-off executing means 11d executes the interoffice hand-off.

The interoffice hand-off executing means 11d transmits, for example, an approval request signal requesting approval for use of the channel selected by the unused channel selecting means 11c in place of an interoffice control signal channel, to the mobile communication exchange 20. If an acknowledging response signal is received from the mobile communication exchange 20 in response to the approval request signal, an interoffice hand-off signal is transmitted to the mobile communication exchange 20 with the use of the channel selected by the unused channel selecting means 11c.

The mobile communication exchange 20 is identical in arrangement with the mobile communication exchange 10, and accordingly, there is a possibility that the mobile communication exchange 10 receives an approval request signal from the mobile communication exchange 20. In such cases, the mobile communication exchange 10 refers to the interoffice speech link management table 11b to determine whether or not the channel with respect to which the approval for use is requested by the approval request signal is an unused channel; if the requested channel is judged to be unused, the exchange 10 generates an acknowledging response signal responsive to the approval request signal and transmits the response signal to the mobile communication exchange 20 which transmitted the approval request signal.

Thus, in cases where the interoffice control signal link (interoffice Map link) is congested, the interoffice hand-off signal is transmitted with the use of the interoffice speech link instead, whereby even if a mobile unit makes interoffice movement during a call while the interoffice control signal link is congested, an interoffice hand-off is carried out normally and the call is not disconnected.

The first embodiment will be now described in more detail. In the following explanation of the first embodiment, the mobile communication exchanges 10 and 20 shown in FIG. 1 correspond, respectively, to CDMA exchanges 10a and 20a in FIG. 2. Similarly, the interoffice control signal link management table lha corresponds to an interoffice Map link management table 17a shown in FIG. 4, the interoffice speech link management table 11b corresponds to an interoffice speech link management table 17b shown in FIG. 4, the unused channel selecting means 11c and the interoffice hand-off executing means 11d correspond to a call control section 14 shown in FIG. 3, the interoffice control signal link 81 corresponds to an interoffice Map link 81a shown in FIG. 2, and the interoffice speech link 82 corresponds to an interoffice speech link 82a shown in FIG. 2.

Figure 2:
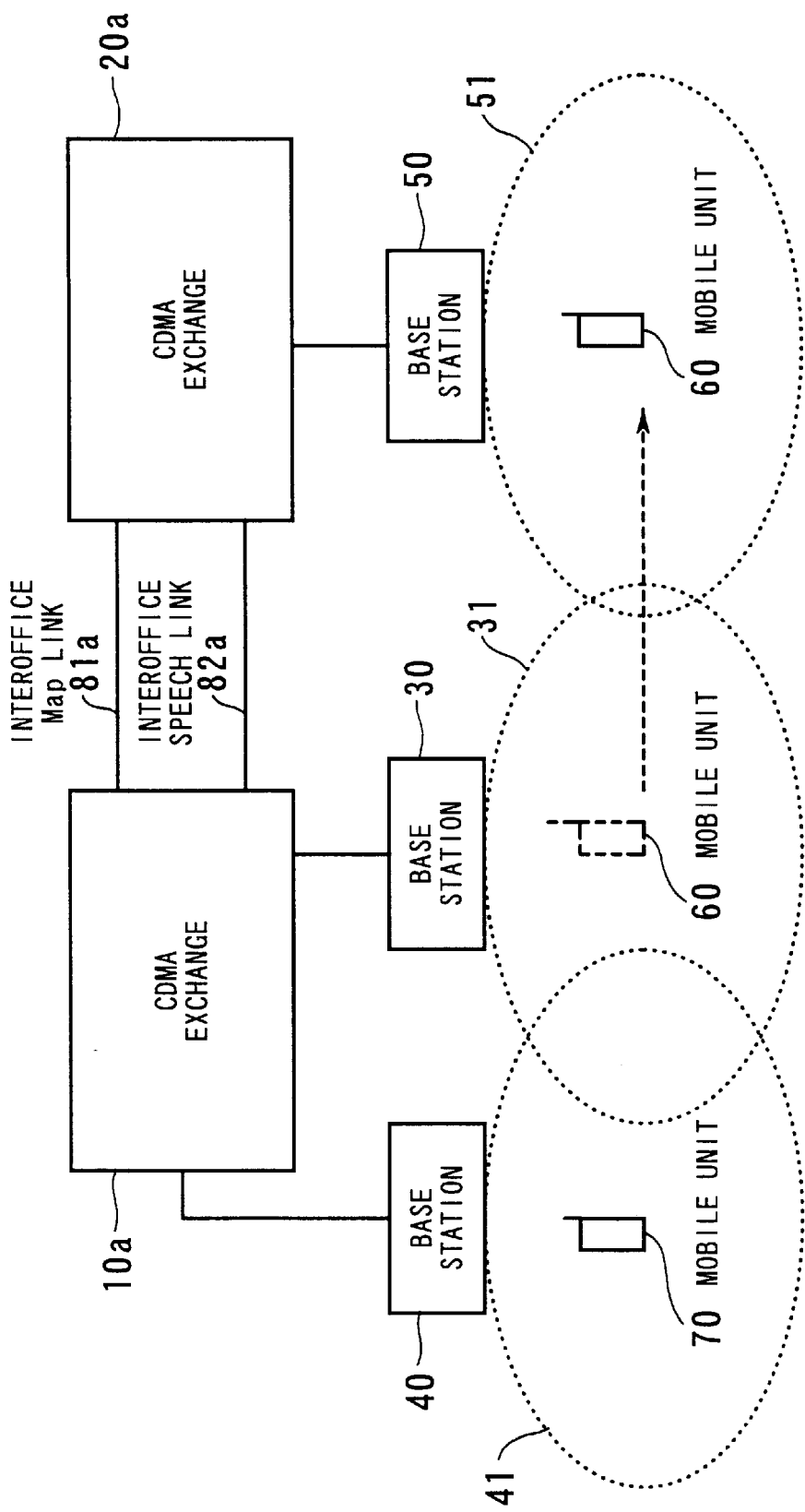
FIG. 2 is a diagram showing the entire configuration of a CDMA mobile communication system including a first embodiment.

FIG. 2 is a diagram showing the entire configuration of a CDMA mobile communication system including the first embodiment.

The CDMA exchanges 10a and 20a serve as mobile communication exchanges in the CDMA mobile communication system. These CDMA exchanges 10a and 20a are connected to each other by the interoffice Map link 81a and the interoffice speech link 82a, and a public network, though not shown in the figure, is connected to each of the exchanges. The interoffice Map link 81a is the one defined by the ITU-T recommendations as IMSCCID. The interoffice speech link 82a is an ISUP or TUP link.

Base stations 30 and 40 are connected to the CDMA exchange 10a, and a base station 50 is connected to the CDMA exchange 20a. The base stations 30, 40 and 50 have service zones 31, 41 and 51, respectively, and mobile units 60 and 70 are located, for example, in the service zones 31 and 41, respectively.

If, in this case, the mobile unit 60 moves to the neighboring service zone 51 while a call is established between the mobile units 60 and 70, then it is necessary to establish a speech path from the mobile unit 70 to the mobile unit 60 via the base station 40, the CDMA exchange 10a, the CDMA exchange 20a and the base station 50 in order. Establishing such a speech path requires an interoffice hand-off process between the CDMA exchanges 10a and 20a and is carried out by transmitting an interoffice hand-off signal from the CDMA exchange 10a to the CDMA exchange 20a.

Figure 3:
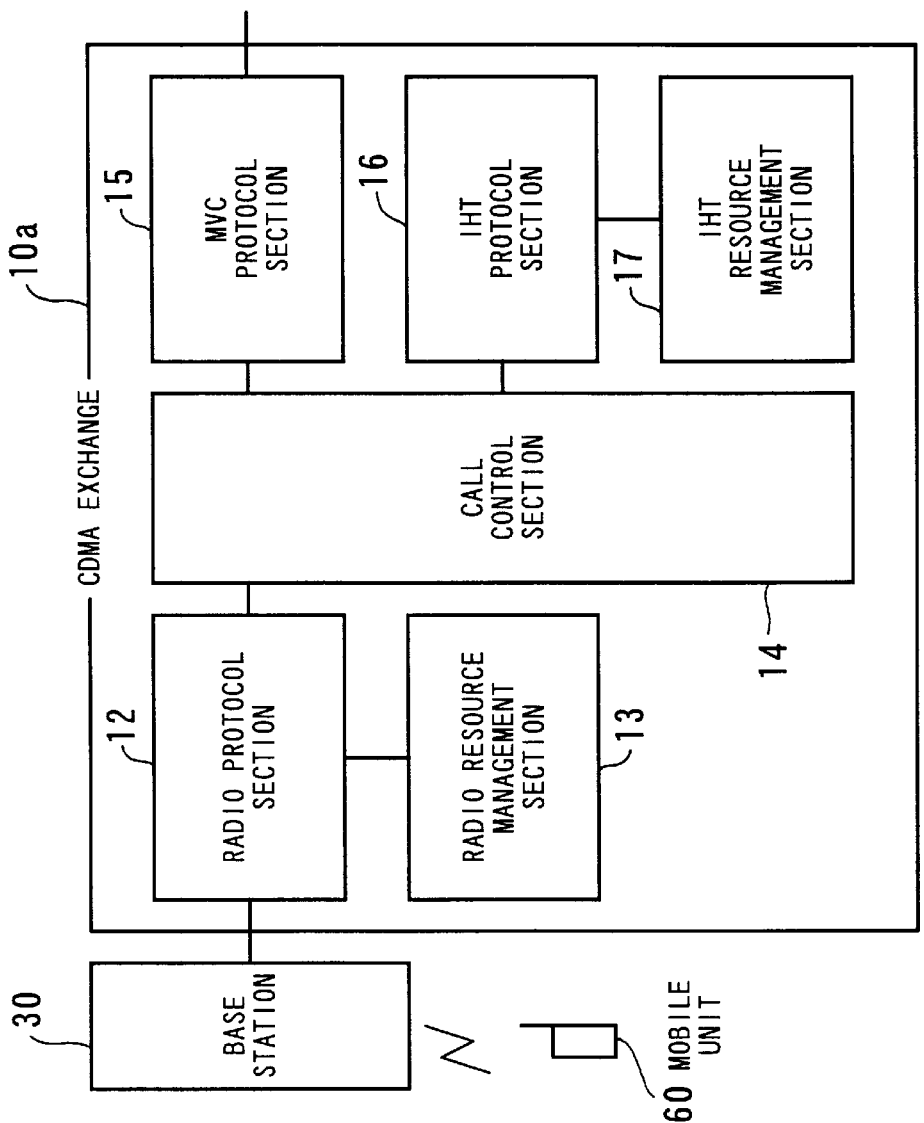
FIG. 3 is a diagram showing the internal arrangement of a CDMA exchange.

FIG. 3 is a diagram showing the internal arrangement of the CDMA exchange 10a. The CDMA exchange 20a also has the same arrangement.

In FIG. 3, a radio protocol section 12 is a section for performing a radio interface process with respect to base stations; it receives an interoffice hand-off request from the mobile unit 60 via the base station 30 and notifies the call control section 14 of the request. A radio resource management section 13 manages the status of use of a radio link and sorts out idle radio channels. The call control section 14 comprises a data processing system including a CPU, RAM, ROM, I/O, etc., and the unused channel selecting means 11c and the interoffice hand-off executing means 11d shown in FIG. 1 are implemented by the processing of the data processing system. On receiving the interoffice hand-off request, the call control section 14 accesses an IHT resource management section 17 via an IHT protocol section 16, to acquire an interoffice Map channel or an interoffice speech channel. The call control section 14 then transmits an interoffice hand-off signal (FACDIR2) to the counter CDMA exchange 20a via an MVC protocol section 15, to thereby perform the interoffice hand-off process. This will be explained in detail later with reference to FIGS. 6 to 8.

FIG. 4 is a diagram showing the internal arrangement of the IHT resource management section 17. As illustrated, an interoffice Map link management table 17a and an interoffice speech link management table 17b are provided and an interoffice resource management processing section 17c is connected to these tables. The interoffice Map link management table 17a describes therein the status of use of each of channels constituting the interoffice Map link 81a, and the interoffice speech link management table 17b describes therein the status of use of each of channels constituting the interoffice speech link 82a. The interoffice resource management processing section 17c monitors the status of use of the interoffice Map link 81a and of the interoffice speech link 82a, and stores use/nonuse status in a corresponding one of the interoffice Map link management table 17a and the interoffice speech link management table 17b. Further, in response to an inquiry from the call control section 14, the interoffice resource management processing section 17c refers to the interoffice Map link management table 17a and the interoffice speech link management table 17b to search for an idle channel, and notifies the call control section 14 of the idle channel.

Figure 5:
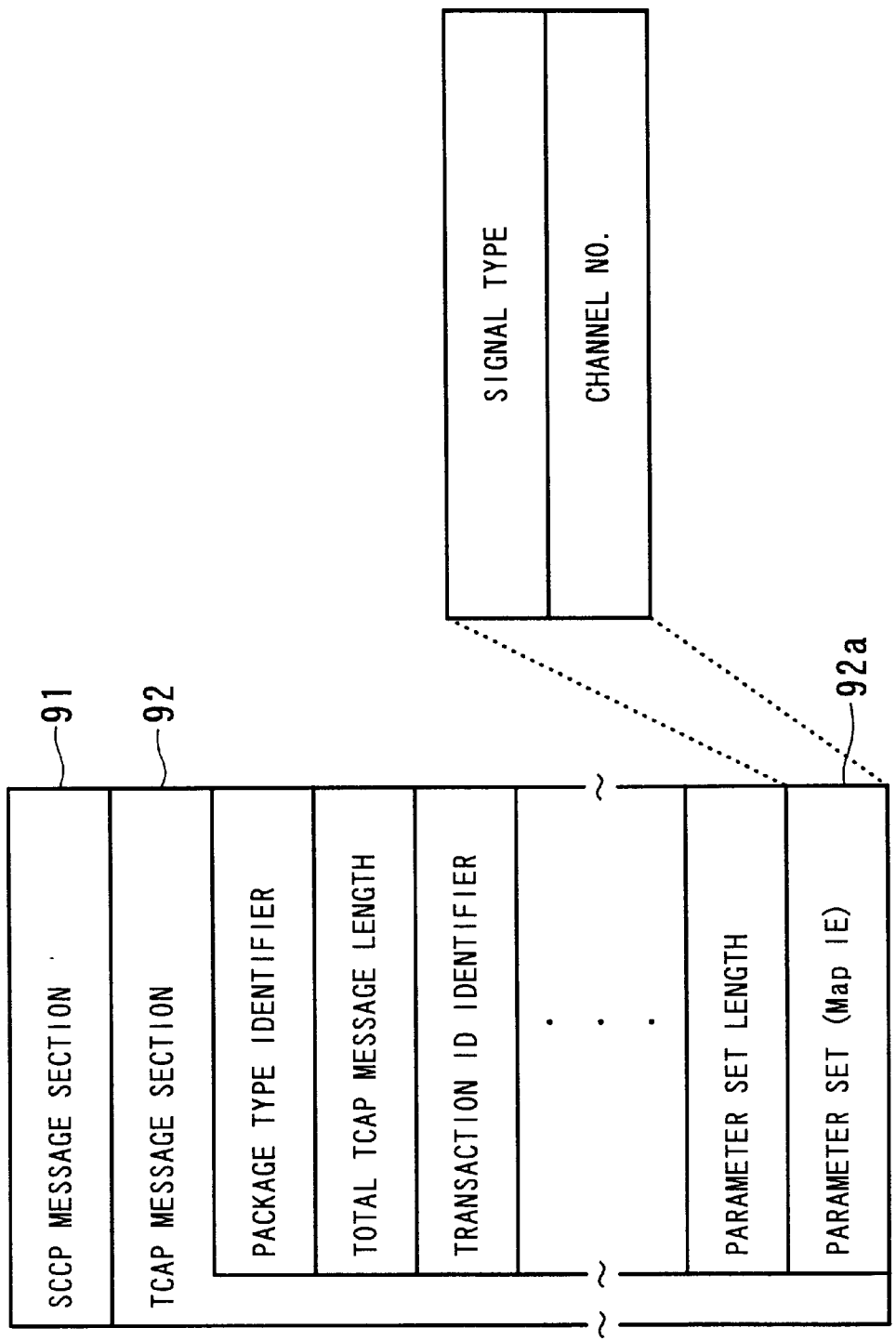
FIG. 5 is a diagram showing the format of a use approval request signal and a response signal which are transmitted from one CDMA exchange to a counter CDMA exchange and vice versa, respectively, when an interoffice speech channel is to be used as an interoffice Map channel.

Referring now to FIG. 5, the form of a use approval request signal and a response signal which the MVC protocol section 15 of the CDMA exchange 10a transmits and receives to and from the counter CDMA exchange 20a via the interoffice speech link 82a, respectively, will be explained.

FIG. 5 is a diagram showing the format of the use approval request signal and the response signal which are transmitted from the CDMA exchange 10a to the counter CDMA exchange 20a and vice versa, respectively, when an idle channel of the interoffice speech link 82a is to be used as an interoffice Map channel.

Specifically, the header in the format of an interoffice speech signal as provided by the ITU-T recommendations is composed of an SCCP (Signaling Connection Control Part) message section 91 and a TCAP (Transaction Capabilities Application Part) message section 92, and the TCAP message section 92 includes a Parameter Set section 92a therein. Utilizing this interoffice speech signal, according to the present invention, a "Signal Type" field and a "Channel No." field are provided in the Parameter Set section 92. When transmitting the use approval request signal, "0" is set in the "Signal Type" field, when transmitting a response signal approving the use of a channel, "1" is set in the "Signal Type" field, and when transmitting a response signal disapproving the use of a channel, "2" is set in the "Signal Type" field. In the "Channel No." field is described the number of an idle channel of the interoffice speech link 82a which is the subject of approval for use.

Figure 6:
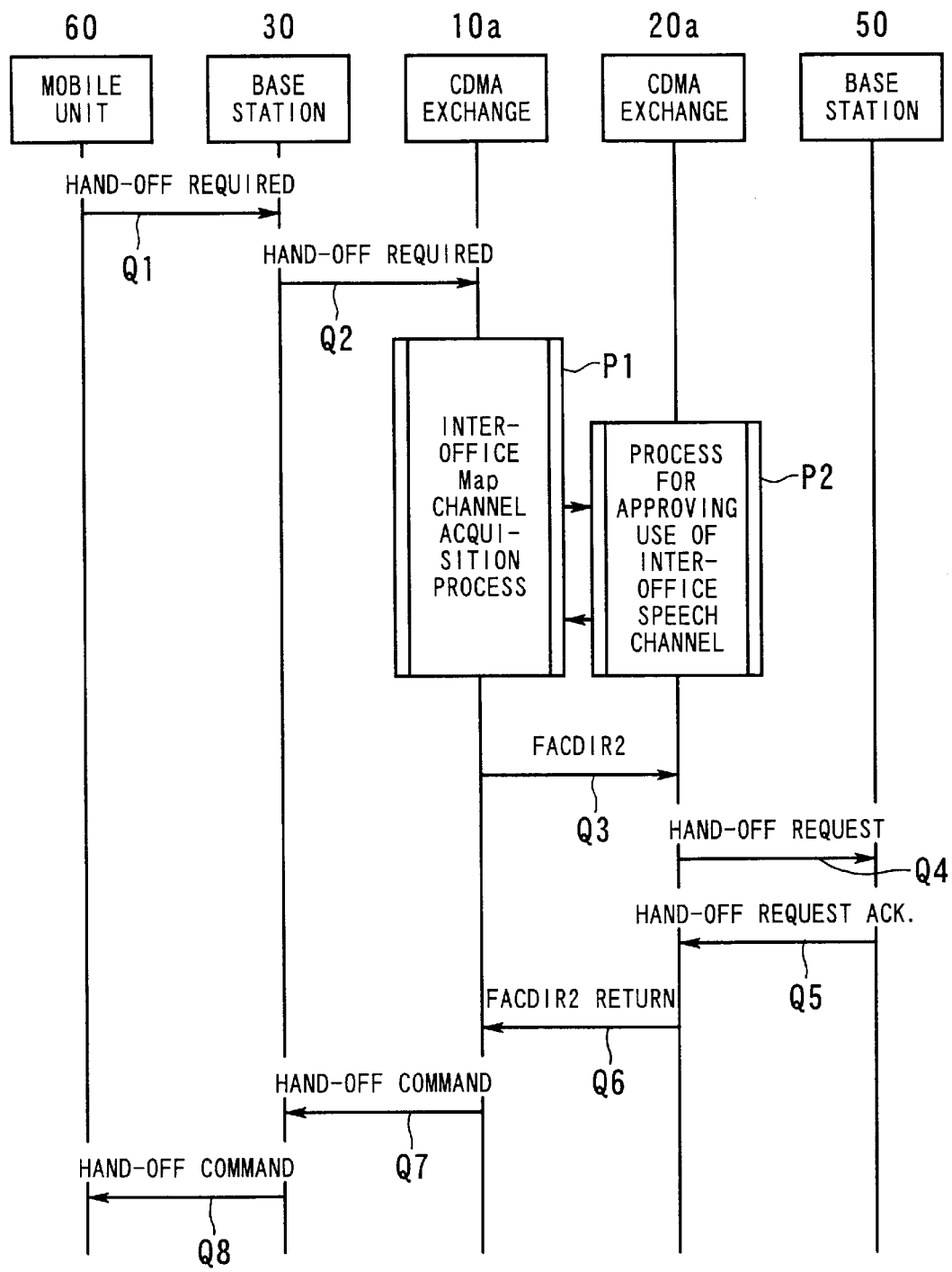
FIG. 6 is a sequence diagram illustrating an interoffice hand-off process performed when an interoffice Map link is congested.

FIG. 6 is a sequence diagram illustrating the interoffice hand-off process performed when the interoffice Map link 81a is congested. In the following explanation of the process, sequence numbers (Q) and process numbers (P) shown in FIG. 6 are referred to where appropriate.

While making interoffice movement, the mobile unit 60 transmits an interoffice hand-off request (Hand-off Required) to the CDMA exchange 10a via the base station 30 (Q1, Q2). The CDMA exchange 10a, on receiving the interoffice hand-off request, performs a process for acquiring an interoffice Map channel (P1), and the counter CDMA exchange 20a performs a process for approving the use of an interoffice speech channel (P2). These processes will be described later with reference to FIGS. 7 and 8.

If it is concluded that the interoffice speech link 82a is to be used for the interoffice Map link 81a, an interoffice hand-off signal is transmitted from the CDMA exchange 10a to the CDMA exchange 20a by using the interoffice speech link 82a (Q3), and the CDMA exchange 20a transmits a hand-off request (Hand-off Request) to the base station 50 (Q4). The sequence Q5, Q6, Q7, Q8 is a response sequence to the sequence Q4, Q3, Q2, Q1.

Figure 7:
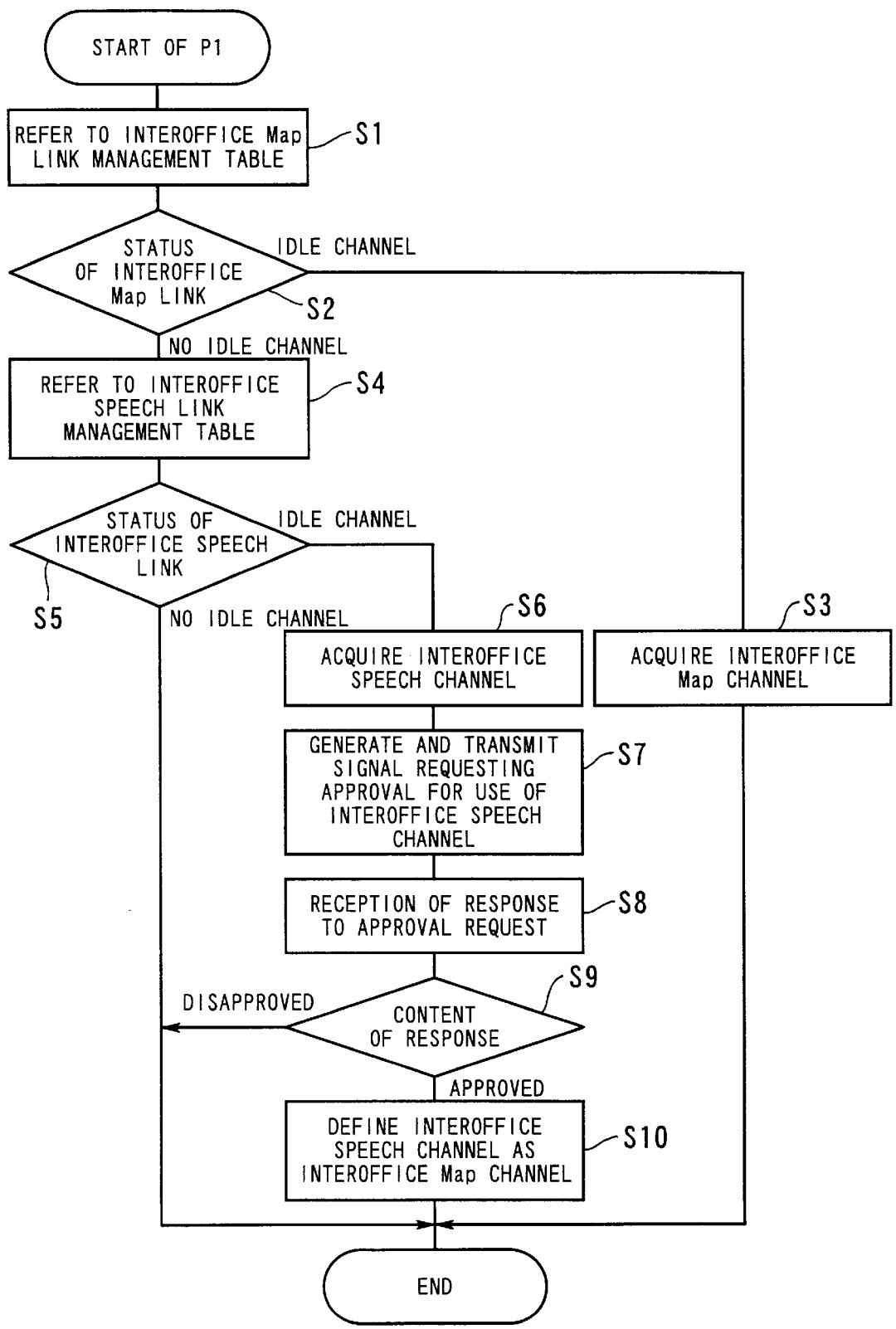
FIG. 7 is a flowchart showing an interoffice Map channel acquisition process executed in the CDMA exchange.

FIG. 7 is a flowchart showing the interoffice Map channel acquisition process P1 executed in the CDMA exchange 10a. In the following, the process will be explained with reference to step numbers (S) shown in FIG. 7.

On receiving the interoffice hand-off request, the CDMA exchange 10a refers to the interoffice Map link management table 17a (S1), to search for an idle channel of the interoffice Map link 81a (S2). If there is an idle channel in the interoffice Map link 81a, the idle channel is acquired (S3), and using this channel, an interoffice hand-off signal is transmitted to the CDMA exchange 20a as in the conventional procedure. On the other hand, if there is no idle channel in the interoffice Map link 81a, reference is made to the interoffice speech link management table 17b (S4) to search for an idle channel of the interoffice speech link 82a (S5). If there is an idle channel in the interoffice speech link 82a, the idle channel is acquired (S6). A signal requesting approval for use of the interoffice speech channel is then generated with the channel number of the acquired idle channel of the interoffice speech link 82a and the value "0" set in the "Channel No." field and the "Signal Type" field, respectively, of the Parameter Set section 92a shown in FIG. 5, and is transmitted to the CDMA exchange 20a (S7). Thus, the CDMA exchange 10a notifies the CDMA exchange 20a whether the acquired idle channel of the interoffice speech link 82a may be used as an interoffice Map channel.

The CDMA exchange 10a then waits until a response to the use approval request is received from the CDMA exchange 20a (S8). The response created by the CDMA exchange 20a will be described later with reference to FIG. 8.

If the received response signal has "1" set in its "Signal Type" field, then it means that the request for use has been approved, and thus the acquired idle channel of the interoffice speech link 82a is used as an interoffice Map channel (S9, S10). If, on the other hand, "2" is set in the "Signal Type" field, it means that the request for use was not approved, and therefore, the acquired idle channel of the interoffice speech link 82a cannot be used as an interoffice Map channel (S9).

Figure 8:
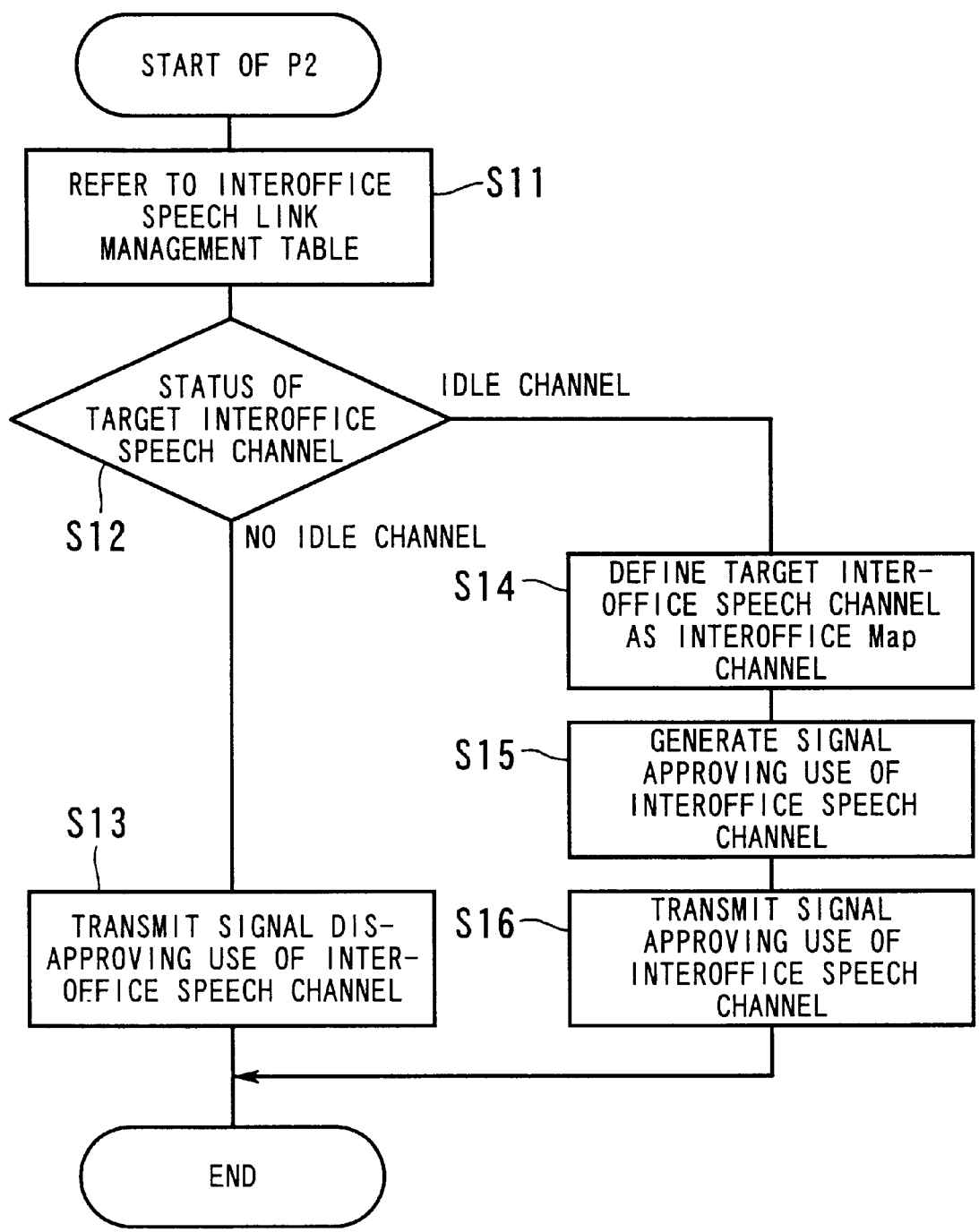
FIG. 8 is a flowchart showing a process for approving use of an interoffice speech channel, executed in the CDMA exchange.

FIG. 8 is a flowchart showing the process P2 for approving the use of an interoffice speech channel, executed in the CDMA exchange 20a. In the following, the process will be explained with reference to step numbers (S) shown in FIG. 8.

On receiving the use approval request signal from the CDMA exchange 10a, the CDMA exchange 20a refers to the interoffice Map link management table therein (S11), to determine whether or not the channel with the channel number specified in the "Channel No." field of the use approval request signal is idle (S12). If the channel specified is not idle, a response signal having "2" set in its "Signal Type" field is transmitted to the CDMA exchange 10a (S13). If the specified channel is idle, the CDMA exchange 20a concludes that the channel should be treated as an interoffice Map channel (S14). Then, a response signal having "1" set in its "Signal Type" field is generated (S15) and transmitted to the CDMA exchange 10a (S16).

The CDMA exchange 10a thereafter transmits an interoffice hand-off signal to the CDMA exchange 20a by using the idle channel of the interoffice speech link 82a acquired in the manner described above.

Thus, even while the interoffice Map link 81a is congested, the interoffice hand-off signal is transmitted using an idle channel of the interoffice speech link 82a instead; accordingly, even if the mobile unit 60 makes interoffice movement during a call while the interoffice Map link 81a is congested, the interoffice hand-off process is performed normally and the call is not disconnected.

A second embodiment will be now described.

The second embodiment is applied to a configuration basically identical with that of the first embodiment shown in FIGS. 2 to 4, and therefore, in the following description of the second embodiment, reference is made to the configuration of the first embodiment.

The second embodiment differs from the first embodiment in the form of signals which the MVC protocol section 15 of the CDMA exchange 10a transmits and receives to and from the counter CDMA exchange 20a via the interoffice speech link 82a. This will be explained with reference to FIGS. 9 and 10. Further, the second embodiment differs from the first embodiment in the operation of the call control section 14 of the CDMA exchange 10a and of the call control section of the counter CDMA exchange 20a, as explained with reference to FIGS. 11 to 14.

Figure 9:
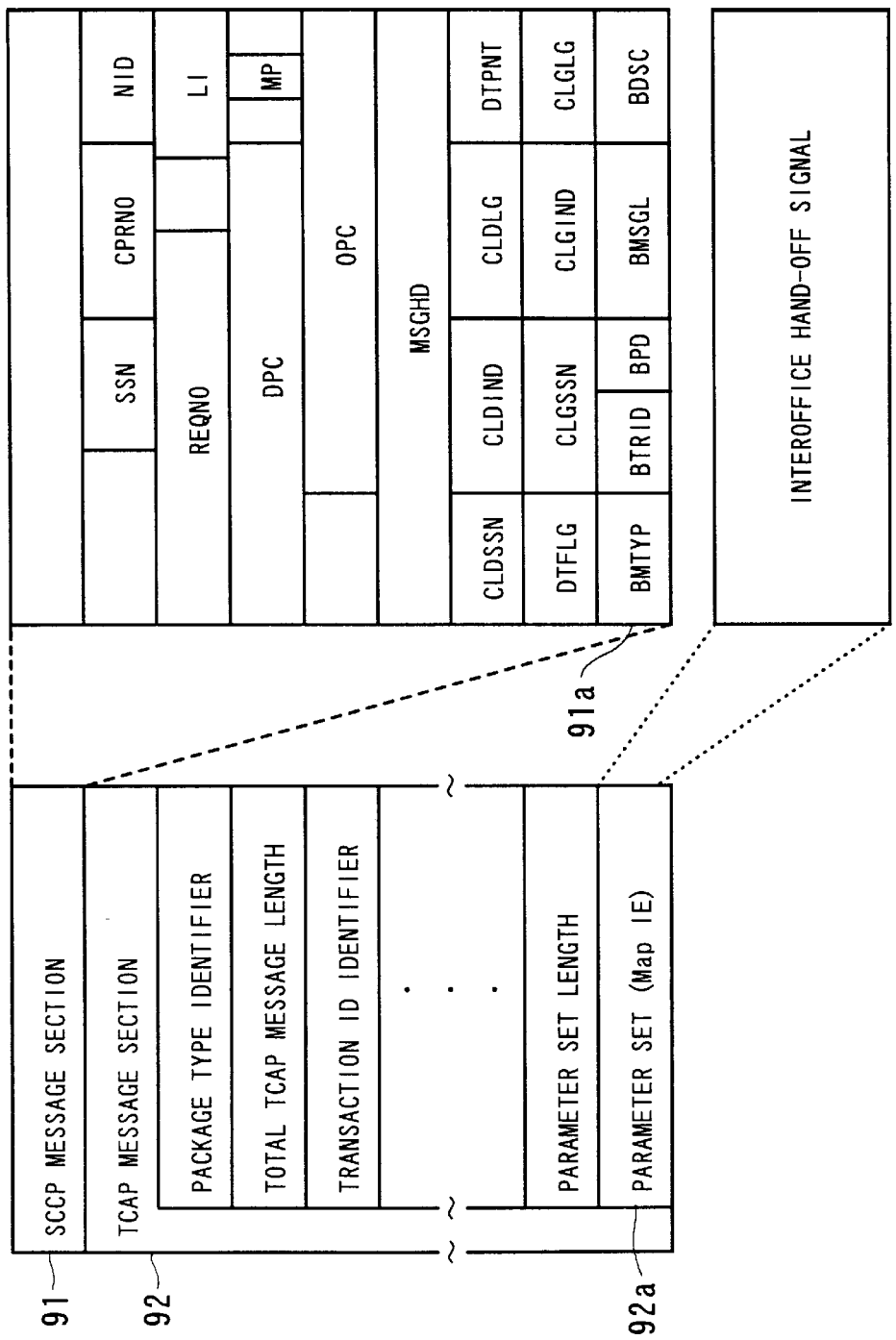
FIG. 9 is a diagram showing the format of an interoffice hand-off signal which is transmitted from one CDMA exchange to a counter CDMA exchange with an interoffice speech channel used as an interoffice Map channel according to a second embodiment.
Figure 10:
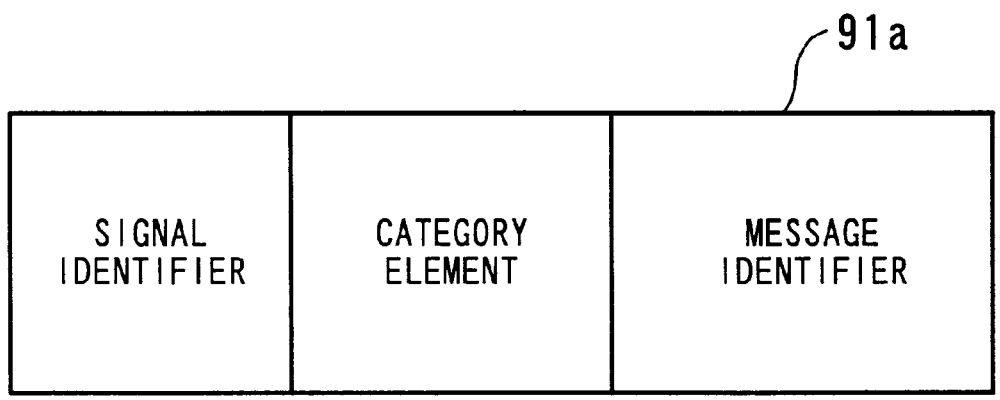
FIG. 10 is a diagram showing the internal arrangement of a "BMTYP" field included in an SCCP message section.

FIG. 9 is a diagram showing the format of an interoffice hand-off signal which is transmitted from the CDMA exchange 10a to the counter CDMA exchange 20a with the use of an idle channel of the interoffice speech link 82a as an interoffice Map channel according to the second embodiment. FIG. 10 is a diagram showing the internal arrangement of a "BMTYP" field 91a included in an SCCP message section 91 shown in FIG. 9.

Specifically, in the second embodiment, a "Signal Identifier" field is additionally provided in the "BMTYP" field 91a which is included in the SCCP message section 91 of the interoffice speech signal. When transmitting an interoffice hand-off signal by means of the interoffice speech signal, "1" is set in the "Signal Identifier" field and also the interoffice hand-off signal is described in the Parameter Set section 92a. When no interoffice hand-off signal is to be transmitted by means of the interoffice speech signal, "0" is set in the "Signal Identifier" field.

Figure 11:
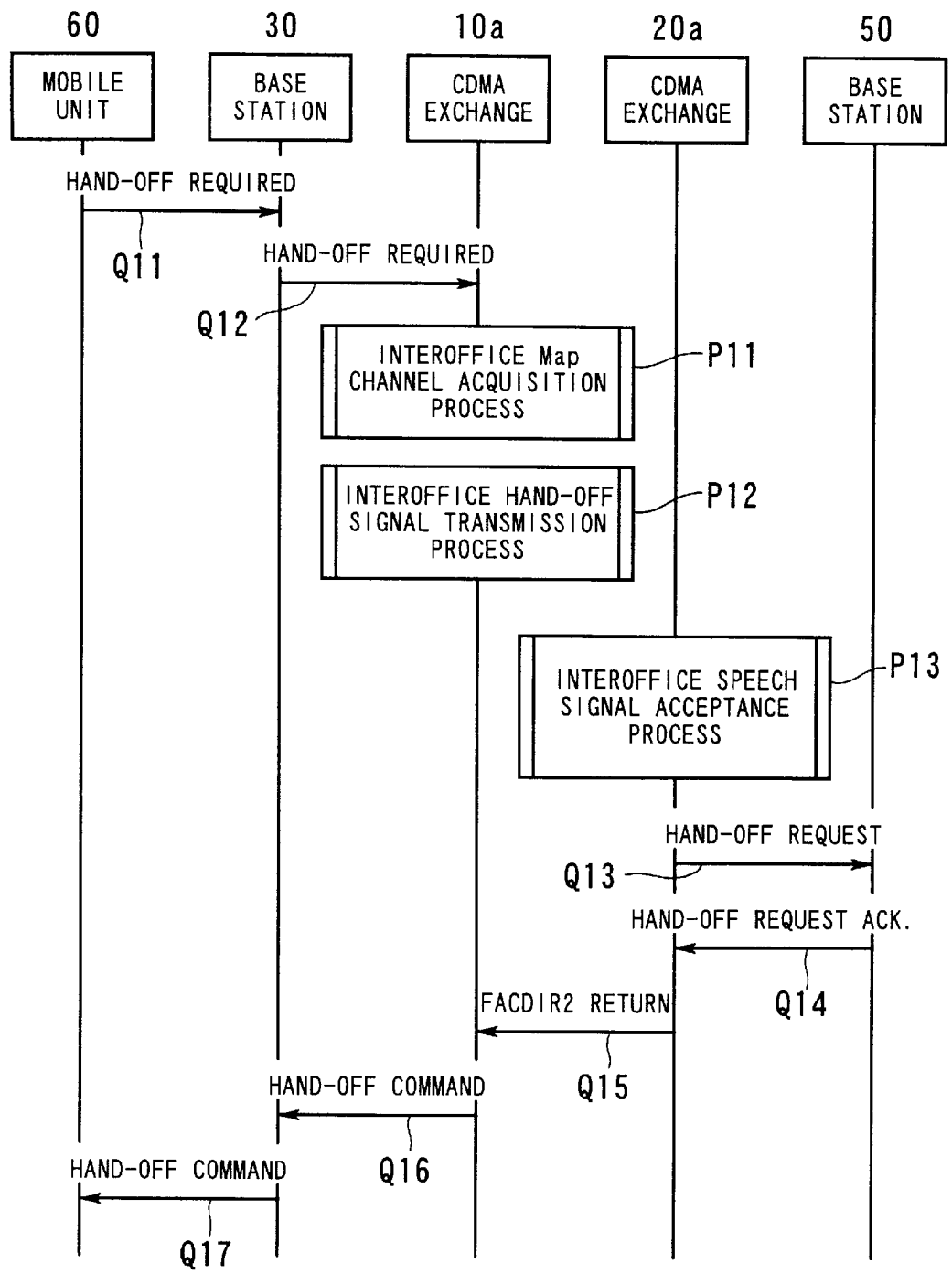
FIG. 11 is a sequence diagram illustrating an interoffice hand-off process according to the second embodiment which process is performed when the interoffice Map link is congested.

FIG. 11 is a sequence diagram illustrating an interoffice hand-off process according to the second embodiment which process is performed when the interoffice Map link 81a is congested.

In FIG. 11, the sequence Q11, Q12 is identical with the sequence Q1, Q2 in the first embodiment shown in FIG. 6, and the sequence Q13–Q17 is identical with the sequence Q4–Q8 shown in FIG. 6; therefore, explanation of these sequences is omitted. Accordingly, processes P11 to P13 will be described with reference to FIGS. 12 to 14.

Figure 12:
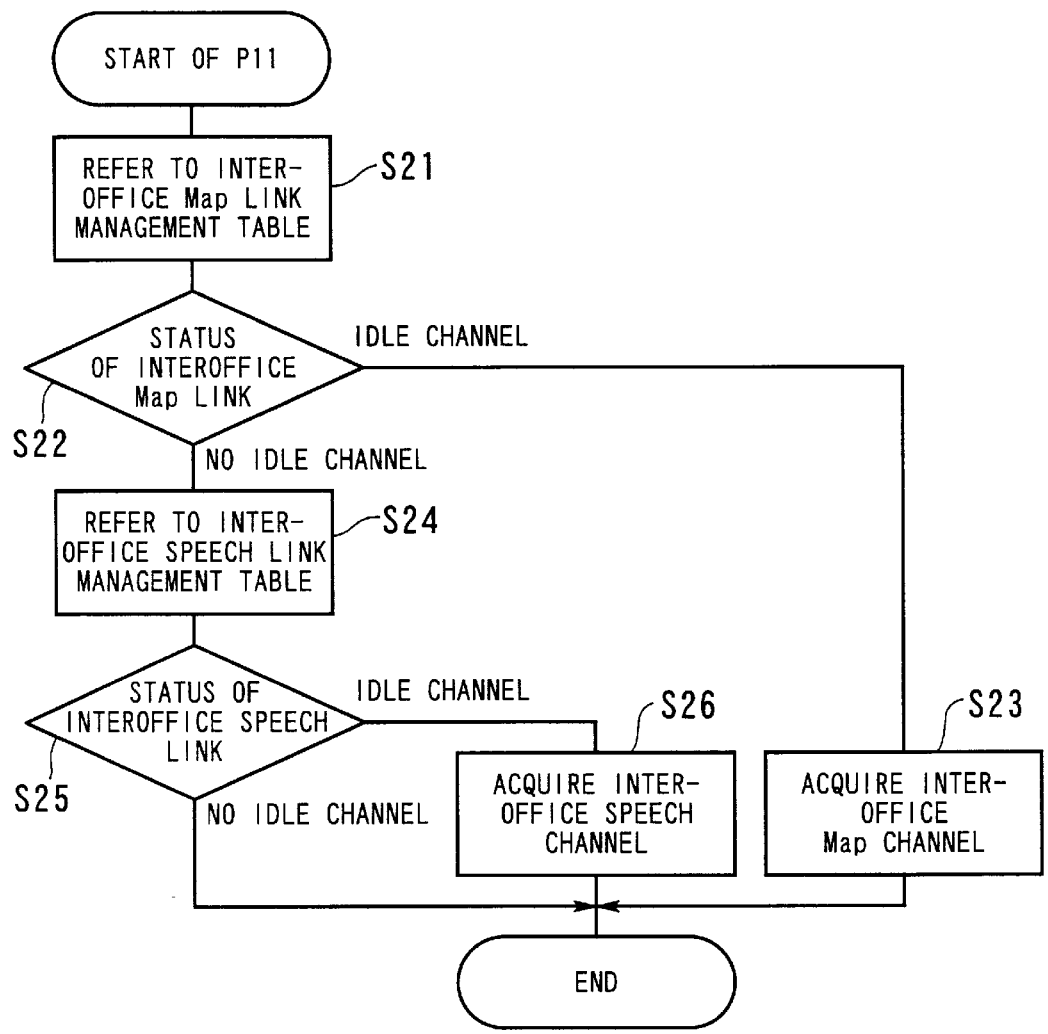
FIG. 12 is a flowchart showing an interoffice Map channel acquisition process executed in the CDMA exchange.

FIG. 12 is a flowchart showing an interoffice Map channel acquisition process P11 executed in the CDMA exchange 10a. In the following, the process will be explained with reference to step numbers (S) shown in FIG. 12.

On receiving an interoffice hand-off request, the CDMA exchange 10a refers to the interoffice Map link management table 17a (S21), to search for an idle channel of the interoffice Map link 81a (S22). If there is an idle channel in the interoffice Map link 81a, the idle channel is acquired (S23), and using this channel, an interoffice hand-off signal is transmitted to the CDMA exchange 20a as in the conventional procedure. On the other hand, if there is no idle channel in the interoffice Map link 81a, reference is made to the interoffice speech link management table 17b (S24), to search for an idle channel of the interoffice speech link 82a (S25). If there exists an idle channel in the interoffice speech link 82a, the idle channel is acquired (S26). If there is no idle channel, interoffice hand-off cannot be carried out.

Figure 13:
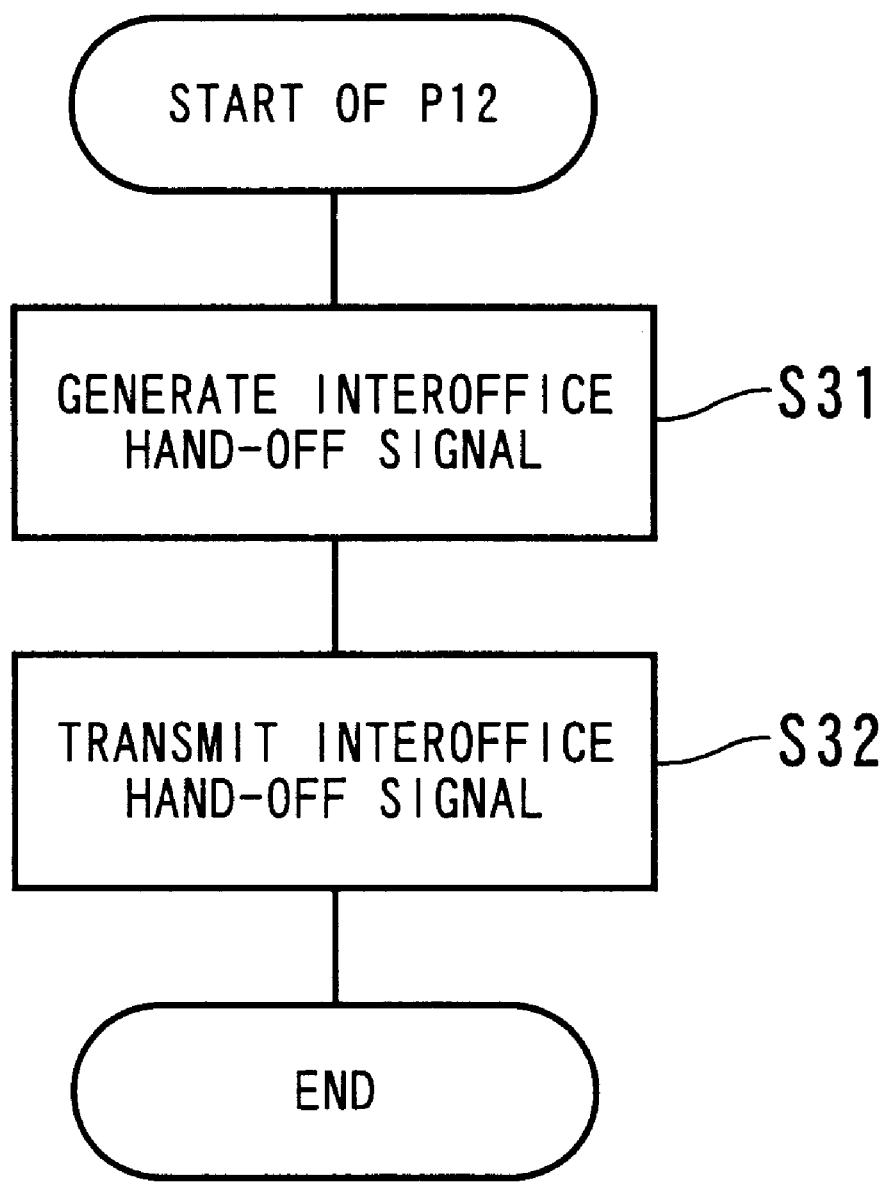
FIG. 13 is a flowchart showing an interoffice hand-off signal transmission process executed in the CDMA exchange.

FIG. 13 is a flowchart showing an interoffice hand-off signal transmission process P12 executed in the CDMA exchange 10a. This process P12 is executed in cases where there is no idle channel in the interoffice Map link 81a but an idle channel exists in the interoffice speech link 82a and is acquired. In the following, the process will be explained with reference to step numbers (S) shown in FIG. 13.

Where there is no idle channel in the interoffice Map link 81a but an idle channel exists in the interoffice speech link 82a and is acquired, the CDMA exchange 10a sets "1" in the "Signal Identifier" field shown in FIG. 10, generates an interoffice speech signal carrying the interoffice hand-off signal described in the Parameter Set section 92a shown in FIG. 9 (S31), and transmits the interoffice speech signal to the counter CDMA exchange 20a (S32).

Figure 14:
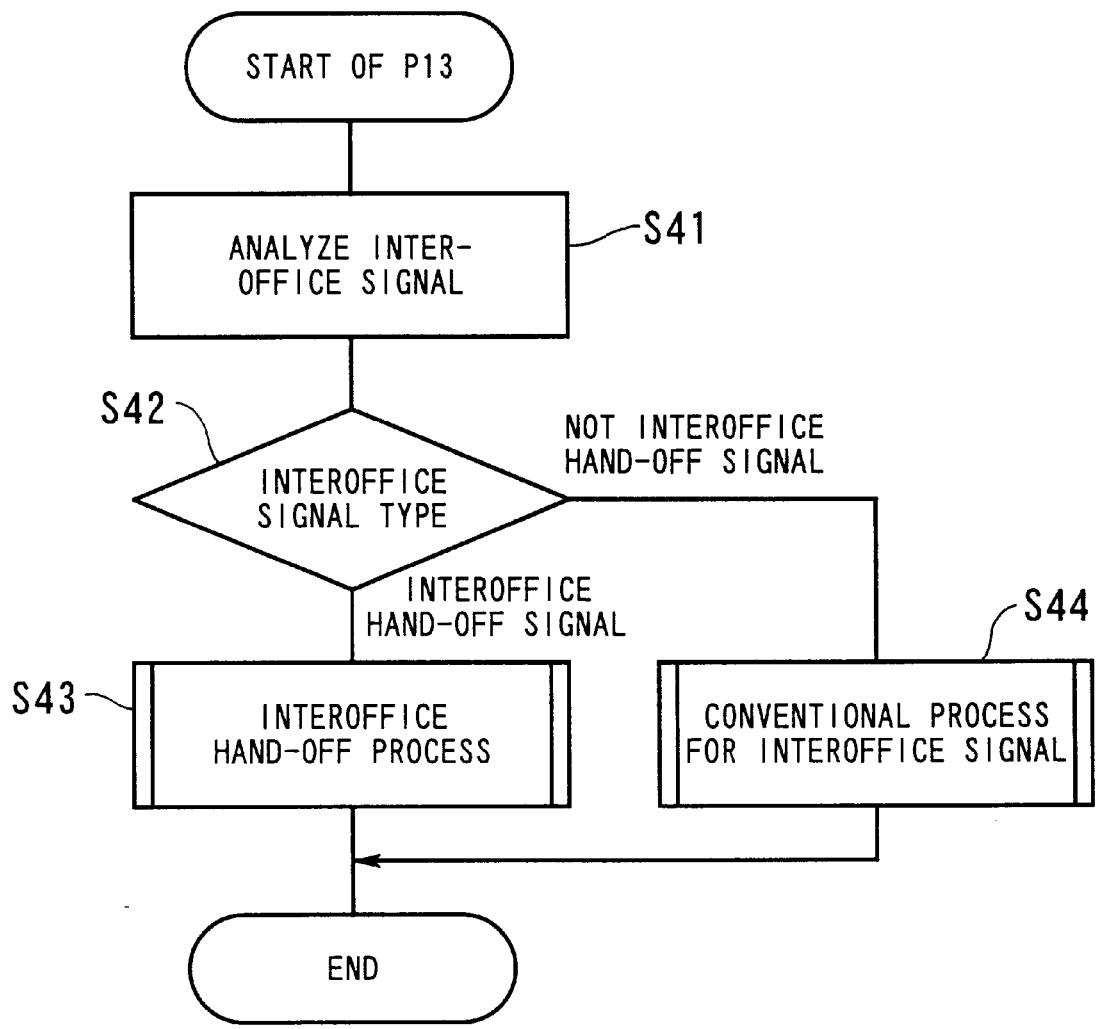
FIG. 14 is a flowchart showing an interoffice signal acceptance process executed in the CDMA exchange.

FIG. 14 is a flowchart showing an interoffice speech signal acceptance process P13 executed in the CDMA exchange 20a. In the following, the process will be explained with reference to step numbers (S) shown in FIG. 14.

The CDMA exchange 20a receives the interoffice speech signal and refers to the "Signal Identifier" field in the "BMTYP" field 91a constituting the header of the interoffice speech signal (S41, S42). If "1" is set in the field, it is judged that an interoffice hand-off signal has been transmitted with the use of the interoffice speech link 82a; therefore, the interoffice hand-off signal described in the Parameter Set section 92a constituting the header of the interoffice speech signal is extracted, and the interoffice hand-off process is performed (S43). If "0" is set in the "Signal Identifier" field, it is judged that an ordinary interoffice speech signal has been received, and thus the conventional process is executed (S44).

Thus, the second embodiment does not require the process for requesting approval for use of an interoffice speech channel or the process for approving the use of the channel, which are needed in the first embodiment, so that the load on the processing of the CDMA exchanges 10a and 20a can be mitigated.

As described above, according to the present invention, when the interoffice control signal link is congested, the mobile communication exchange selects an unused channel in the interoffice speech link. After receiving approval for use of the selected channel from the counter mobile communication exchange, the exchange transmits an interoffice hand-off signal by using the selected channel.

Accordingly, even if a mobile unit makes interoffice movement during a call while the interoffice control signal link is congested, the interoffice hand-off process is carried out normally and the call is not disconnected.

Alternatively, when the interoffice control signal link is congested, the mobile communication exchange selects an unused channel in the interoffice speech link and, using the selected channel, transmits an interoffice speech signal to which is added a signal identifier indicative of transmission of the interoffice hand-off signal, to the counter mobile communication exchange. The counter mobile communication exchange judges, by checking the signal identifier, that the interoffice hand-off signal has been received, and executes the interoffice hand-off.

Consequently, the process relating to approval for use of an interoffice speech channel is unnecessary, whereby the load on the processing of the mobile communication exchanges can be mitigated.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. An interoffice hand-off processing system provided in a mobile communication exchange having an interoffice control signal link and an interoffice speech link for communications with another mobile communication exchange, comprising:

an interoffice control signal link management table having status of use of the interoffice control signal link described therein;

an interoffice speech link management table having status of use of the interoffice speech link described therein;

unused channel selecting means for searching for an unused channel by referring to said interoffice control signal link management table when execution of an interoffice hand-off is requested from a subordinate base station, said unused channel selecting means selecting an unused channel by referring to said interoffice speech link management table if no unused channel is found; and interoffice hand-off executing means for executing the interoffice hand-off by using the channel selected by said unused channel selecting means.

2. The interoffice hand-off processing system according to claim 1, wherein said mobile communication exchange is an exchange constituting a CDMA mobile communication system, said interoffice control signal link is an interoffice Map link, and said interoffice speech link is one of an ISUP link and a TUP link.

3. The interoffice hand-off processing system according to claim 1, wherein said interoffice hand-off executing means includes approval request signal transmitting means for transmitting an approval request signal requesting approval for use of the channel selected by said unused channel selecting means in place of a channel of the interoffice control signal link, to a counter mobile communication exchange with respect to which an interoffice hand-off is to be executed; and interoffice hand-off signal transmitting means for transmitting an interoffice hand-off signal to the counter mobile communication exchange by using the channel selected by said unused channel selecting means when an acknowledging response signal is received from the counter mobile communication exchange in response to the approval request signal.

4. The interoffice hand-off processing system according to claim 3, further comprising checking means for referring to said interoffice speech link management table when an approval request signal is received from the counter mobile communication exchange, to determine whether or not a channel with respect to which approval for use is requested by the approval request signal is an unused channel; and response signal transmitting means for generating an acknowledging response signal in response to the approval request signal when the channel is judged to be unused by said checking means, and transmitting the response signal to the mobile communication exchange which transmitted the approval request signal.

5. The interoffice hand-off processing system according to claim 1, wherein said interoffice hand-off executing means includes transmitting means for transmitting a signal to which are added an interoffice hand-off signal and a signal identifier indicating that the signal is an interoffice control signal, to a counter mobile communication exchange with respect to which an interoffice hand-off is to be executed, and said interoffice hand-off processing system further comprises determining means for determining whether or not the signal identifier indicative of interoffice control signal is added to a signal received from the counter mobile communication exchange; and execution means for executing an interoffice hand-off process based on the interoffice hand-off signal added to the signal along with the signal identifier when it is judged by said determining means that the signal identifier indicative of interoffice control signal is added to the signal.

6. An interoffice hand-off method for an interoffice hand-off processing system provided in a mobile communication exchange having an interoffice control signal link and an interoffice speech link for communications with another mobile communication exchange, comprising:

the first step of monitoring status of use of the interoffice control signal link and storing the status of use in an interoffice control signal link management table;

the second step of monitoring status of use of the interoffice speech link and storing the status of use in an interoffice speech link management table;

the third step of searching for an unused channel by referring to the interoffice control signal link management table when execution of an interoffice hand-off is requested from a subordinate base station;

the fourth step of selecting an unused channel by referring to the interoffice speech link management table if no unused channel is found as a result of search in said third step; and the fifth step of executing the interoffice hand-off by using the channel selected in said fourth step.

* * * * *